Figure 1A:
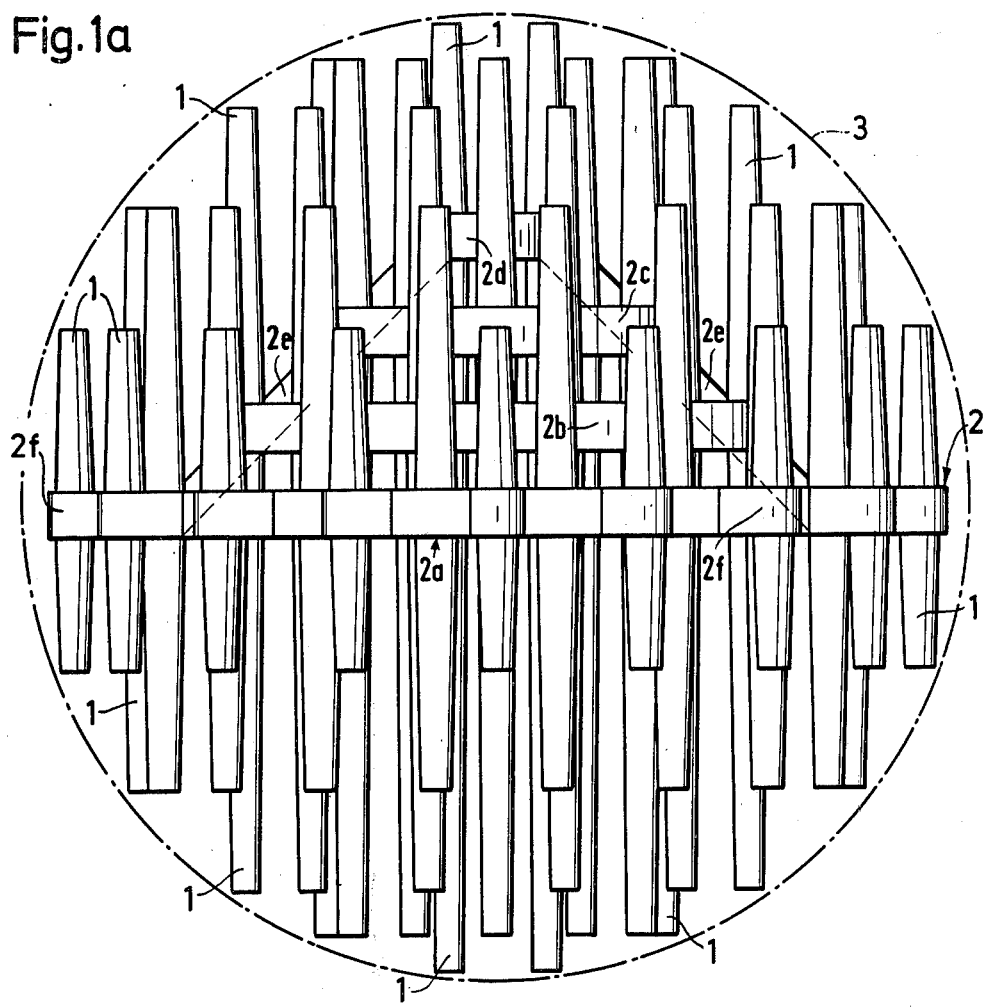

United States Patent [19]

Fattinger

[11] 4,072,736
[45] Feb. 7, 1978

[54] PACKING MATERIAL
[75] Inventor: Volker Fattinger, Arlesheim, Switzerland
[73] Assignee: Ciba-Geigy Corporation, Ardsley, N.Y.
[21] Appl. No.: 732,639
[22] Filed: Oct. 15, 1976

Related U.S. Application Data

[63] Continuation-in-part of Ser. No. 563,909, March 31, 1975, abandoned.

[30] Foreign Application Priority Data

Apr. 5, 1974 Switzerland .................... 4844/74

[51] Int. Cl.² .............................................. B01F 3/04
[52] U.S. Cl. ..................................... 261/97; 261/112; 261/DIG. 72
[58] Field of Search .................... 261/94–98, 261/112, 113, DIG. 72; 55/94, 97; 210/150, 151

[56] References Cited

U.S. PATENT DOCUMENTS

| | | | |
|---|---|---|---|
| 2,054,809 | 9/1936 | Fleisher | 261/98 X |
| 2,198,861 | 4/1940 | Chamberlain et al. | 261/95 |
| 2,375,336 | 5/1945 | Weitkamp | 261/95 |
| 2,867,425 | 1/1959 | Teller | 261/95 |
| 3,208,833 | 9/1965 | Carson | 261/96 X |
| 3,329,271 | 7/1967 | Ward et al. | 210/150 |
| 3,446,489 | 5/1969 | Leva | 261/97 |
| 3,704,869 | 12/1972 | Priestley | 261/112 |
| 3,810,348 | 5/1974 | Byers et al. | 261/98 X |

FOREIGN PATENT DOCUMENTS

| | | | |
|---|---|---|---|
| 402,851 | 9/1924 | Germany | 261/DIG. 72 |
| 352,495 | 5/1935 | Germany | 261/DIG. 72 |
| 897,796 | 5/1962 | United Kingdom | 261/DIG. 72 |

Primary Examiner—Tim R. Miles
Assistant Examiner—Richard L. Chiesa
Attorney, Agent, or Firm—Harry Falber

[57] ABSTRACT

A packing material for liquid/gas contact reaction apparatus, in particular for gas purifying systems, which consists of a plurality of parallel rods arranged on a basket-shaped carrier and so dimensioned that it has an approximately spherical or spheroid form. The carrier consists preferably of parallel rings of staggered diameters. The packing material according to the invention has an extraordinarily high degree of efficiency and is very easy and relatively cheap to manufacture.

4 Claims, 3 Drawing Figures

PACKING MATERIAL

RELATED APPLICATIONS

This application is a continuation-in-part of application Ser. No. 563,909, filed Mar. 31, 1975 now abandoned.

In packed towers, the liquid stream flows by gravity over the surface of a packing material while the gases will generally flow in a countercurrent direction to contact the liquid. Such towers are utilized, for example, for fractionation, absorption, extraction, gas purification and heat transfer purposes. The packing is positioned in the tower in order to provide increased contact between liquid and gas. Accordingly, the packing should preferably be easy and economical to use and manufacture. It should provide sufficient contact surface without impeding the liquid and/or gaseous flow and without causing liquid maldistribution.

Packing materials are used in the most diverse forms wherever as large a surface area as possible is to be produced within a given volume. Packing material in the form of wire-like structures has proved especially effective for gas purifying systems, since the ratio between the volume they occupy and that filled with material is extremely high. One of the best known packing materials of this kind is described in U.S. Pat. No. 2,867,425. It is made of plastic and has the shape of a helix the ends of which are joined. This known packing does have the disadvantage, however, that it is relatively difficult and expensive to manufacture on account of its complicated form. Other known packing materials are disclosed, for example, in U.S. Pat. No. 2,375,336 (discs), U.S. Pat. No. 3,704,869 (sheets) and U.S. Pat. No. 3,810,348.

It is the principal object of the invention to provide a packing material which provides uniform distribution of both liquid and vapor throughout the column, but which does not possess the disadvantages noted above.

According to the invention, this is accomplished by means of a packing which consists of rods which are arranged substantially parallel to each other on a carrier. This construction provides a substantially increased area of contact while allowing for substantially unrestricted liquid and gaseous flow. It also facilitates tight packing in the column while still providing sufficient open spaces so as not to impede the flow or cause backup difficulties.

Figure 1B:
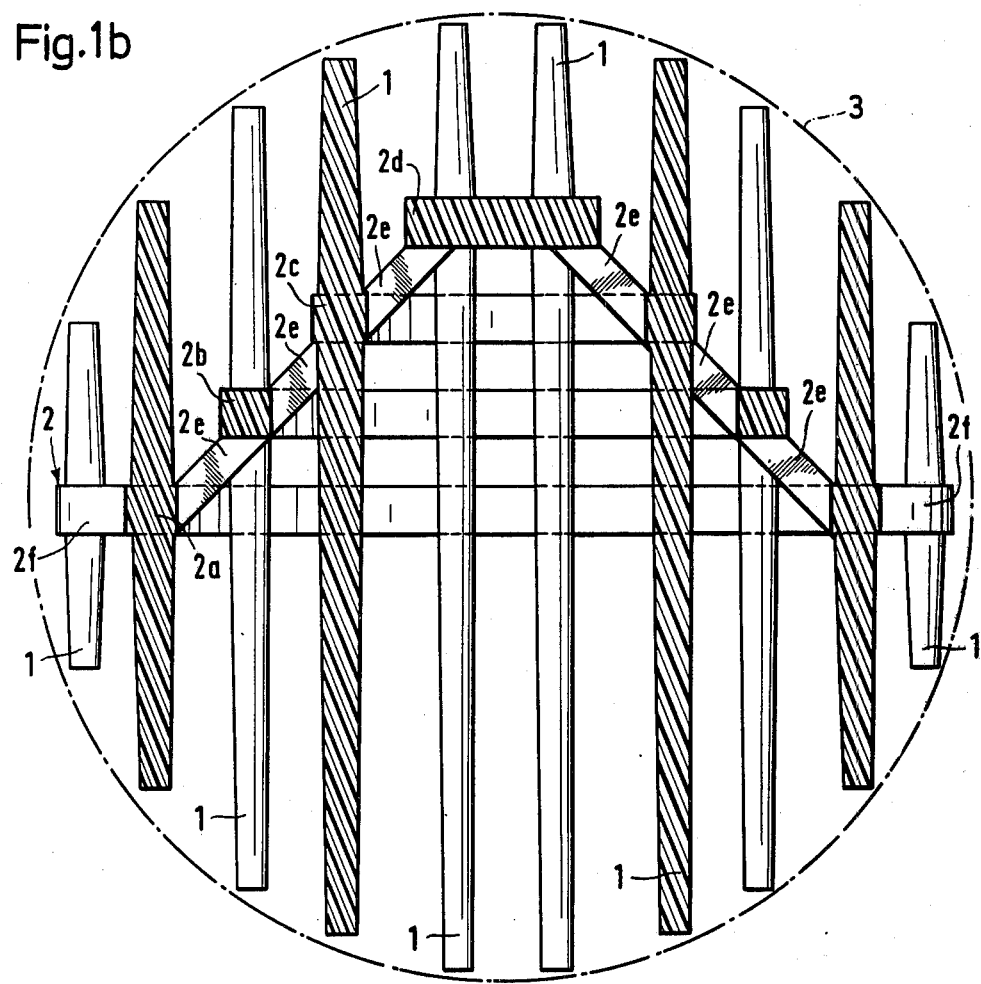
Figure 2:
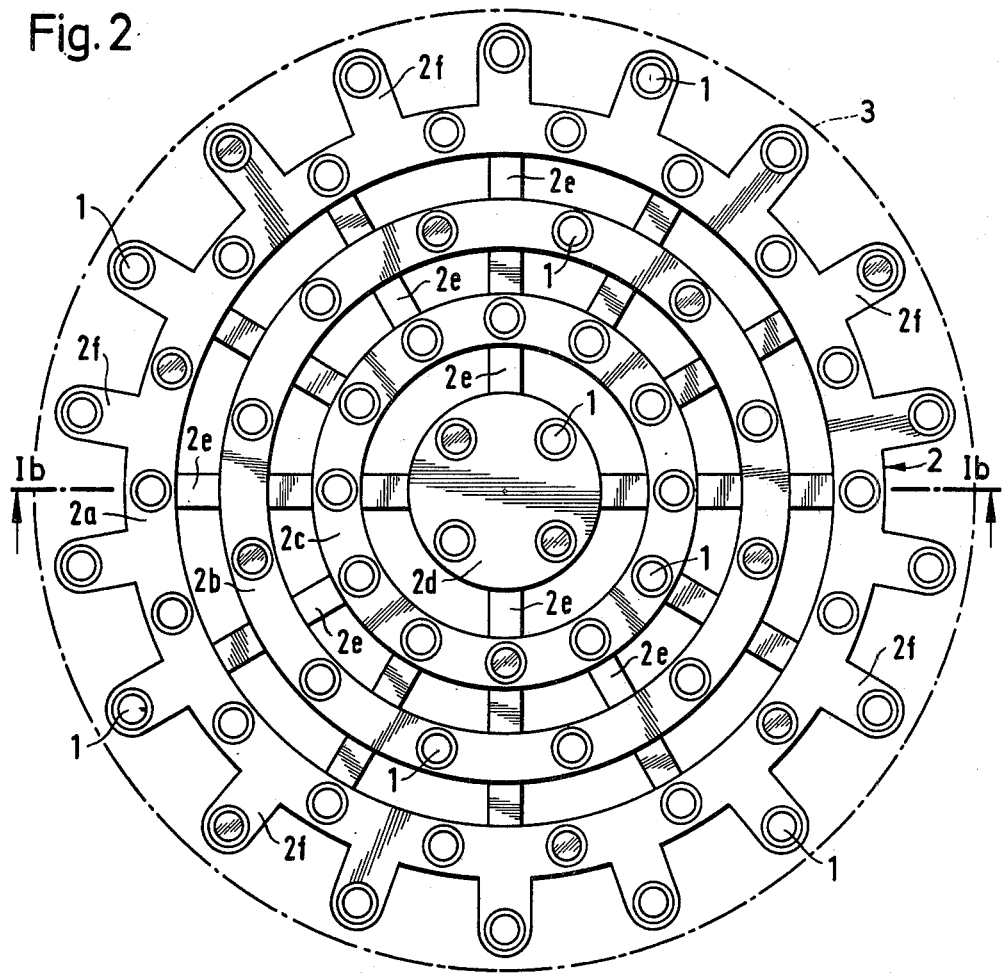

The invention is described hereinafter in more detail by means of an embodiment illustrated in the drawings wherein:

FIG. 1a shows an elevation vertically to the rods,

FIG. 1b a sectional view taken along the line 1b—1b in FIG. 2 and FIG. 2 shows the embodiment in a view perpendicular to the rods.

As illustrated in the drawings, the packing consists of a plurality of parallel rods 1 of circular section which are arranged on a carrier 2. The carrier 2 is axially symmetric with respect to an axis which is parallel to the rods 1. The rods 1 are so arranged on the carrier 2 and their respective lengths are so dimensioned that the entire packing has an approximately spherical shape as viewed circumferentially. Other packing envelopes 3, for example a spheroid one, would of course also be possible.

The depicted carrier comprises three parallel rings 2a, 2b and 2c and a disc 2d. The three rings and the disc are held together by ribs 2e and in such a manner that they form a substantially conical basket. This arrangement ensures that the spaces between a pair of rings and a pair of ribs are not too small and consequently that they have no great resistance to flow. The largest ring 2a is provided on its periphery with radial prolongations 2f, each of which carries a rod 1 at its extremity.

Instead of a conical or spherical basket, a pyramid-shaped basket can also be used as carrier for the rods. In this case, the parallel rings can have the form of polygons, e.g., triangles, squares or hexagons. It is advantageous, in each instance, to provide at least two rings with more than three rods each, regardless of the shape or configuration of the basket.

In use, the instant packing is inserted into the tower either in a bulk, pre-determined relationship or in a random relationship. The depth and density of packing can best be determined by the practitioner in accordance with his own particular needs. The flexibility of the construction in terms of the free-standing rods and the material of manufacture as well as the possiblity for integrating adjacent packing elements allows for a diversity of packing arrangements. In all instances, the instant packing provides sufficient surfaces to allow for maximum distribution of liquid and for thin liquid film formation so as to provide an increased area of liquid-gas contact. Correspondingly, the spaces between the respective rods and the carrier rings are sufficiently large and numerous to facilitate liquid flow without impedance and the difficulties stemming therefrom. Accordingly, the instant construction ensures efficient liquid-gas contact.

The packing material described hereinbefore can be very easily manufactured of, e.g., polyethylene or polypropylene, by injection moulding, since the mould required is itself relatively simply manufactured. The mould need consist only of two parts, the joint face being conical and coinciding with the external surface of the ribs 2e. The cavities which are negative to the rings and ribs are then simply annular grooves or grooves which run in the direction of the generatrices of both mould joint faces. Parallel boreholes in both halves of the mould correspond to the rods. The boreholes can be cylindrical or preferably conical to facilitate removal from the mould.

In order that the packing material described herein can reliably perform the task required of it, the spaces between any two parallel rods should not be less than about twice the diameters of the rods. Preferably the spaces are from about twice to ten times the diameters of the rods. In addition, the interstices of the basket-shaped carrier, i.e., the spaces which are defined by a pair of rings and a pair of ribs, should be as large as possible. If these conditions are fulfilled, the packing has no pronounced privileged directions with respect to the resistance to flow, i.e., it is approximately equally effective in any position.

Measurements in gas purifying systems have shown that, with respect to the degree of absorption attained therewith, the packing material according to the invention is under normal conditions at least on a par with the known helical packing mentioned at the outset, and, especially at higher velocities of flow and lower concentrations of the substances to be purified, even superior to it.

What is claimed is:

1. A packing material unit for positioning in bulk or random relationship within a liquid-gas contact apparatus in order to enlarge the contacting surface of a liquid and a gas flowing through said apparatus, said unit comprising a carrier consisting of rings of staggered diameter which are arranged parallel to each other and spaced apart coaxially, and a plurality of rods positioned on said rings extending from two opposite sides of said carrier and arranged substantially parallel to each other and at least approximately evenly distributed over the whole surface of a cross sectional area perpendicular to said rods, said cross sectional area being of substantially circular or elliptical shape, the length of said rods decreasing from the center of said cross sectional area towards the periphery thereof in such a manner that the unit is substantially spherical or spheroidal.

2. The unit of claim 1, wherein said carrier is in basket shape.

3. The unit of claim 1, which comprises at least two rings in said carrier and at least four rods on each ring.

4. The unit according to claim 3, wherein the spaces between any two rods are from two to ten times the diameter of said rods.

* * * * *